United States Patent
Comerford et al.

(10) Patent No.: US 8,642,977 B2
(45) Date of Patent: Feb. 4, 2014

(54) ARTICLE INCLUDING SEMICONDUCTOR NANOCRYSTALS

(75) Inventors: Mark Comerford, Boston, MA (US); Gregory V. Moeller, Ashland, MA (US); Vladimir Bulovic, Lexington, MA (US); Seth Coe-Sullivan, Belmont, MA (US)

(73) Assignee: QD Vision, Inc., Lexington, MA (US)

( * ) Notice: Subject to any disclaimer, the term of this patent is extended or adjusted under 35 U.S.C. 154(b) by 0 days.

(21) Appl. No.: 12/231,887

(22) Filed: Sep. 5, 2008

(65) Prior Publication Data
US 2009/0152567 A1     Jun. 18, 2009

Related U.S. Application Data

(63) Continuation of application No. PCT/US2007/005589, filed on Mar. 6, 2007.

(60) Provisional application No. 60/779,740, filed on Mar. 7, 2006.

(51) Int. Cl.
    *F21K 2/00*     (2006.01)
(52) U.S. Cl.
    USPC ........................................ 250/462.1
(58) Field of Classification Search
    USPC ........................................ 250/462.1
    See application file for complete search history.

(56) References Cited

U.S. PATENT DOCUMENTS

| | | | |
|---|---|---|---|
| 3,510,732 A | 5/1970 | Amans et al. | |
| 3,774,086 A | 11/1973 | Vincent, Jr. | |
| 3,825,792 A | 7/1974 | Rokosz et al. | |
| 3,875,456 A | 4/1975 | Kano et al. | |
| 4,035,686 A | 7/1977 | Fleming | |
| 4,082,889 A | 4/1978 | DeStefano | |
| 4,130,343 A | 12/1978 | Miller et al. | |
| 4,366,407 A | 12/1982 | Walsh | |
| 4,377,750 A | 3/1983 | Pape et al. | |
| 4,382,272 A | 5/1983 | Quella et al. | |
| 4,394,068 A | 7/1983 | Pape et al. | |
| 4,608,301 A | 8/1986 | Ishizuka et al. | |
| 4,652,464 A | 3/1987 | Ludium et al. | |
| 4,719,386 A | 1/1988 | Toho | |
| 4,738,798 A | 4/1988 | Mahler | |
| 4,766,526 A | 8/1988 | Morimoto et al. | |
| 4,772,885 A | 9/1988 | Uehara et al. | |

(Continued)

FOREIGN PATENT DOCUMENTS

EP     0328202     8/1989
EP     1731583     12/2006

(Continued)

OTHER PUBLICATIONS

A. Akimov, et al, "Semiconductor nanocrystals in a polymeric matrix: new optical media" Opt. Spectrosc. 72 (4), Apr. 1992.

(Continued)

*Primary Examiner* — David Porta
*Assistant Examiner* — Mindy Vu (57) ABSTRACT

An article comprising an array of semiconductor nanocrystals arranged in a predetermined pattern, wherein the semiconductor nanocrystals are capable of generating light of one or more predetermined wavelengths in response to ambient light. In one embodiment the semiconductor nanocrystals emit light of different predetermined wavelengths.

41 Claims, 2 Drawing Sheets

Scattering "Mirrors" on back plane direct light Toward predetermined pattern

Waveguide or Parabolic Effect Collects and guides Ambient Light for Absorption and Re-Emission By Semiconductor Nanocrystals

(56) References Cited

U.S. PATENT DOCUMENTS

| | | | |
|---|---|---|---|
| 4,780,752 A | 10/1988 | Angerstein et al. |
| 4,820,016 A | 4/1989 | Cohen et al. |
| 4,931,692 A | 6/1990 | Takagi et al. |
| 5,064,718 A | 11/1991 | Buscall et al. |
| 5,077,147 A | 12/1991 | Tanaka et al. |
| 5,091,115 A | 2/1992 | Nogami et al. |
| 5,093,286 A | 3/1992 | Nogami et al. |
| 5,132,051 A | 7/1992 | Herron |
| 5,208,462 A | 5/1993 | O'Connor et al. |
| 5,243,457 A | 9/1993 | Spencer |
| 5,260,957 A | 11/1993 | Hakimi et al. |
| 5,294,870 A | 3/1994 | Tang et al. |
| 5,300,783 A | 4/1994 | Spencer et al. |
| 5,422,489 A | 6/1995 | Bhargava |
| 5,434,878 A | 7/1995 | Lawandy |
| 5,442,254 A | 8/1995 | Jaskie |
| 5,455,489 A | 10/1995 | Bhargava |
| 5,470,910 A | 11/1995 | Spanhel et al. |
| 5,504,661 A | 4/1996 | Szpak |
| 5,527,386 A | 6/1996 | Statz |
| 5,534,056 A | 7/1996 | Kuehnle et al. |
| 5,586,879 A | 12/1996 | Szpak |
| 5,716,679 A | 2/1998 | Krug et al. |
| 5,717,289 A | 2/1998 | Tanaka |
| 5,777,433 A | 7/1998 | Lester et al. |
| 5,813,752 A | 9/1998 | Singer et al. |
| 5,813,753 A | 9/1998 | Vriens et al. |
| 5,830,529 A | 11/1998 | Ross |
| 5,847,507 A | 12/1998 | Butterworth et al. |
| 5,874,803 A | 2/1999 | Garbuzov et al. |
| 5,881,200 A | 3/1999 | Burt |
| 5,882,779 A | 3/1999 | Lawandy |
| 5,909,081 A | 6/1999 | Eida et al. |
| 5,917,279 A | 6/1999 | Elschner et al. |
| 5,955,528 A | 9/1999 | Sato et al. |
| 5,959,316 A | 9/1999 | Lowery et al. |
| 5,962,971 A | 10/1999 | Chen |
| 5,988,822 A | 11/1999 | Abe et al. |
| 6,023,371 A | 2/2000 | Onitsuka et al. |
| 6,048,616 A | 4/2000 | Gallagher et al. |
| 6,066,861 A | 5/2000 | Hohn et al. |
| 6,117,529 A | 9/2000 | Leising et al. |
| 6,166,856 A | 12/2000 | Araki et al. |
| 6,236,493 B1 | 5/2001 | Schmidt et al. |
| 6,249,372 B1 | 6/2001 | Kobayashi et al. |
| 6,319,426 B1 | 11/2001 | Bawendi et al. |
| 6,322,901 B1 | 11/2001 | Bawendi et al. |
| 6,358,652 B1 | 3/2002 | Tomiuchi et al. |
| 6,464,898 B1 | 10/2002 | Tomoike et al. |
| 6,482,664 B1 | 11/2002 | Kanekiyo |
| 6,493,051 B2 | 12/2002 | Ha et al. |
| 6,501,091 B1 | 12/2002 | Bawendi et al. |
| 6,515,314 B1 | 2/2003 | Duggal et al. |
| 6,565,770 B1 | 5/2003 | Mayer et al. |
| 6,576,155 B1 | 6/2003 | Barbera-Guillem |
| 6,576,291 B2 | 6/2003 | Bawendi et al. |
| 6,577,073 B2 | 6/2003 | Shimizu et al. |
| 6,580,545 B2 | 6/2003 | Morrison et al. |
| 6,586,096 B2 | 7/2003 | Border et al. |
| 6,600,175 B1 | 7/2003 | Baretz et al. |
| 6,608,332 B2 | 8/2003 | Shimizu et al. |
| 6,608,439 B1 | 8/2003 | Sokolik et al. |
| 6,637,924 B2 | 10/2003 | Pelka et al. |
| 6,650,044 B1 | 11/2003 | Lowery |
| 6,653,778 B1 | 11/2003 | Tomiuchi et al. |
| 6,656,566 B1 | 12/2003 | Kuykendall et al. |
| 6,677,610 B2 | 1/2004 | Choi et al. |
| 6,692,031 B2 | 2/2004 | McGrew |
| 6,703,781 B2 | 3/2004 | Zovko |
| 6,710,366 B1 | 3/2004 | Lee et al. |
| 6,710,911 B2 | 3/2004 | LoCascio et al. |
| 6,731,359 B1 | 5/2004 | Fukaya |
| 6,734,465 B1 | 5/2004 | Taskar et al. |
| 6,744,077 B2 | 6/2004 | Trottier et al. |
| 6,744,960 B2 * | 6/2004 | Pelka ........................... 385/130 |
| 6,777,531 B2 | 8/2004 | Yasuda et al. |
| 6,777,706 B1 | 8/2004 | Tessler et al. |
| 6,781,148 B2 | 8/2004 | Kubota et al. |
| 6,784,603 B2 * | 8/2004 | Pelka et al. .................... 313/113 |
| 6,791,259 B1 | 9/2004 | Stokes et al. |
| 6,793,755 B2 | 9/2004 | Schaupp et al. |
| 6,794,686 B2 | 9/2004 | Chang et al. |
| 6,803,719 B1 | 10/2004 | Miller et al. |
| 6,812,500 B2 | 11/2004 | Reeh et al. |
| 6,819,845 B2 | 11/2004 | Lee et al. |
| 6,821,559 B2 | 11/2004 | Eberspacher et al. |
| 6,827,769 B2 | 12/2004 | Auslander et al. |
| 6,830,835 B2 | 12/2004 | Saito et al. |
| 6,835,326 B2 | 12/2004 | Barbera-Guillem |
| 6,838,743 B2 | 1/2005 | Yamada et al. |
| 6,841,785 B2 | 1/2005 | Nolt |
| 6,849,109 B2 | 2/2005 | Yadav et al. |
| 6,858,470 B1 | 2/2005 | Han et al. |
| 6,864,626 B1 | 3/2005 | Weiss et al. |
| 6,870,311 B2 | 3/2005 | Mueller et al. |
| 6,876,796 B2 | 4/2005 | Garito et al. |
| 6,885,033 B2 | 4/2005 | Andrews |
| 6,887,332 B1 | 5/2005 | Kagan et al. |
| 6,891,330 B2 | 5/2005 | Duggal et al. |
| 6,903,505 B2 | 6/2005 | McNulty et al. |
| 6,913,830 B2 | 7/2005 | Decker et al. |
| 6,914,106 B2 | 7/2005 | Leon et al. |
| 6,924,596 B2 | 8/2005 | Sato et al. |
| 6,957,608 B1 | 10/2005 | Hubert et al. |
| 6,984,297 B2 | 1/2006 | Nisch et al. |
| 7,005,667 B2 | 2/2006 | Chen et al. |
| 7,005,669 B1 | 2/2006 | Lee |
| 7,008,559 B2 | 3/2006 | Chen |
| 7,040,774 B2 | 5/2006 | Beeson et al. |
| 7,042,020 B2 | 5/2006 | Negley |
| 7,045,956 B2 | 5/2006 | Braune et al. |
| 7,046,439 B2 | 5/2006 | Kaminsky et al. |
| 7,065,285 B2 | 6/2006 | Chen et al. |
| 7,066,623 B2 | 6/2006 | Lee et al. |
| 7,070,300 B2 | 7/2006 | Harbers et al. |
| 7,078,732 B1 | 7/2006 | Reeh et al. |
| 7,090,355 B2 | 8/2006 | Liu et al. |
| 7,091,656 B2 | 8/2006 | Murazaki et al. |
| 7,102,152 B2 | 9/2006 | Chua et al. |
| 7,123,796 B2 | 10/2006 | Steckl et al. |
| 7,126,162 B2 | 10/2006 | Reeh et al. |
| 7,129,515 B2 | 10/2006 | Okuyama et al. |
| 7,135,816 B2 | 11/2006 | Kawaguchi et al. |
| 7,144,131 B2 | 12/2006 | Rains |
| 7,160,613 B2 | 1/2007 | Bawendi et al. |
| 7,166,010 B2 * | 1/2007 | Lamansky et al. ............... 445/24 |
| 7,172,811 B2 | 2/2007 | Denisyuk et al. |
| 7,175,948 B2 | 2/2007 | Yoshihara et al. |
| 7,189,768 B2 | 3/2007 | Baran et al. |
| 7,190,870 B2 | 3/2007 | Sundar et al. |
| 7,196,354 B1 | 3/2007 | Erchak et al. |
| 7,199,393 B2 | 4/2007 | Park et al. |
| 7,213,940 B1 | 5/2007 | Van De Ven et al. |
| 7,214,428 B2 | 5/2007 | Naasani |
| 7,235,792 B2 | 6/2007 | Elofson |
| 7,239,080 B2 | 7/2007 | Ng et al. |
| 7,242,030 B2 | 7/2007 | Wang et al. |
| 7,253,452 B2 | 8/2007 | Steckel et al. |
| 7,265,488 B2 | 9/2007 | Ng et al. |
| 7,273,309 B2 | 9/2007 | Ford et al. |
| 7,321,193 B2 | 1/2008 | Antoniadis et al. |
| 7,326,365 B2 | 2/2008 | Bawendi et al. |
| 7,350,933 B2 | 4/2008 | Ng et al. |
| 7,374,807 B2 | 5/2008 | Parce et al. |
| 7,381,516 B2 * | 6/2008 | Arney et al. ................. 430/270.1 |
| 7,390,568 B2 | 6/2008 | Kim et al. |
| 7,393,618 B2 | 7/2008 | Ioku et al. |
| 7,420,323 B2 | 9/2008 | Krummacher |
| 7,430,355 B2 | 9/2008 | Heikenfeld et al. |
| 7,462,502 B2 | 12/2008 | Paolini et al. |
| 7,481,562 B2 | 1/2009 | Chua et al. |
| 7,495,383 B2 | 2/2009 | Chua et al. |
| 7,497,581 B2 | 3/2009 | Beeson et al. |
| 7,513,669 B2 | 4/2009 | Chua et al. |

(56) References Cited

U.S. PATENT DOCUMENTS

| | | |
|---|---|---|
| 7,534,002 B2 | 5/2009 | Yamaguchi et al. |
| 7,535,524 B2 | 5/2009 | Chua et al. |
| 7,553,683 B2 | 6/2009 | Martin et al. |
| 7,554,257 B2 | 6/2009 | Krummacher et al. |
| 7,645,397 B2 | 1/2010 | Parce et al. |
| 7,682,850 B2 | 3/2010 | Harbers et al. |
| 7,686,493 B2 | 3/2010 | Roshan et al. |
| 7,692,373 B2 | 4/2010 | Bawendi et al. |
| 7,723,744 B2 | 5/2010 | Gillies |
| 7,793,755 B2 | 9/2010 | Ogasawara |
| 2001/0001207 A1 | 5/2001 | Shimizu et al. |
| 2002/0021003 A1 | 2/2002 | McGrew |
| 2002/0071948 A1 | 6/2002 | Duff et al. |
| 2002/0186921 A1 | 12/2002 | Schumacher et al. |
| 2003/0107688 A1 | 6/2003 | Yamagishi |
| 2003/0151700 A1 | 8/2003 | Carter et al. |
| 2003/0156425 A1 | 8/2003 | Turnbull et al. |
| 2003/0160260 A1 | 8/2003 | Hirai et al. |
| 2003/0211288 A1 | 11/2003 | Schottland |
| 2003/0227249 A1 | 12/2003 | Mueller et al. |
| 2004/0007169 A1 | 1/2004 | Ohtsu et al. |
| 2004/0095658 A1 | 5/2004 | Buretea et al. |
| 2004/0118448 A1 | 6/2004 | Scher et al. |
| 2004/0178338 A1 | 9/2004 | Empedocles et al. |
| 2004/0203170 A1* | 10/2004 | Barbera-Guillem .......... 436/164 |
| 2004/0233139 A1 | 11/2004 | Asano et al. |
| 2005/0009224 A1 | 1/2005 | Yang et al. |
| 2005/0012076 A1 | 1/2005 | Morioka |
| 2005/0088079 A1 | 4/2005 | Daniels |
| 2005/0093422 A1 | 5/2005 | Wang et al. |
| 2005/0098787 A1 | 5/2005 | Andrews |
| 2005/0133087 A1* | 6/2005 | Alivisatos et al. ............ 136/263 |
| 2005/0134723 A1 | 6/2005 | Lee et al. |
| 2005/0135079 A1 | 6/2005 | Yin Chua et al. |
| 2005/0139852 A1 | 6/2005 | Chen et al. |
| 2005/0142343 A1 | 6/2005 | Winkler et al. |
| 2005/0164227 A1 | 7/2005 | Ogura et al. |
| 2005/0180680 A1 | 8/2005 | Kong |
| 2005/0230693 A1 | 10/2005 | Chen |
| 2005/0236556 A1 | 10/2005 | Sargent et al. |
| 2005/0258418 A1* | 11/2005 | Steckel et al. .................. 257/40 |
| 2005/0265404 A1 | 12/2005 | Ashdown |
| 2005/0265935 A1* | 12/2005 | Hollingsworth et al. ....... 424/59 |
| 2005/0275615 A1 | 12/2005 | Kahen et al. |
| 2005/0279949 A1 | 12/2005 | Oldham et al. |
| 2006/0001036 A1 | 1/2006 | Jacob et al. |
| 2006/0002101 A1 | 1/2006 | Wheatley |
| 2006/0003097 A1 | 1/2006 | Andres et al. |
| 2006/0003114 A1 | 1/2006 | Enlow et al. |
| 2006/0003156 A1 | 1/2006 | Masutani et al. |
| 2006/0012853 A1* | 1/2006 | Tallone et al. ................. 359/333 |
| 2006/0024525 A1 | 2/2006 | Jeong et al. |
| 2006/0034065 A1 | 2/2006 | Thurk |
| 2006/0060862 A1 | 3/2006 | Bawendi et al. |
| 2006/0063289 A1 | 3/2006 | Negley et al. |
| 2006/0066210 A1 | 3/2006 | Ng et al. |
| 2006/0068154 A1 | 3/2006 | Parce et al. |
| 2006/0081862 A1 | 4/2006 | Chua et al. |
| 2006/0103589 A1 | 5/2006 | Chua et al. |
| 2006/0105483 A1 | 5/2006 | Leatherdale et al. |
| 2006/0113895 A1 | 6/2006 | Baroky et al. |
| 2006/0128845 A1 | 6/2006 | Emrick et al. |
| 2006/0145599 A1 | 7/2006 | Stegamat et al. |
| 2006/0147703 A1 | 7/2006 | Walker et al. |
| 2006/0157686 A1 | 7/2006 | Jang et al. |
| 2006/0157720 A1 | 7/2006 | Bawendi et al. |
| 2006/0160209 A1* | 7/2006 | Larson et al. .............. 435/287.2 |
| 2006/0169971 A1 | 8/2006 | Cho et al. |
| 2006/0196375 A1 | 9/2006 | Coe-Sullivan et al. |
| 2006/0197437 A1 | 9/2006 | Krummacher et al. |
| 2006/0199886 A1 | 9/2006 | Ryang |
| 2006/0204676 A1 | 9/2006 | Jones et al. |
| 2006/0204679 A1 | 9/2006 | Jones et al. |
| 2006/0210726 A1 | 9/2006 | Jones et al. |
| 2006/0214903 A1 | 9/2006 | Kurosaka |
| 2006/0215958 A1 | 9/2006 | Yeo et al. |
| 2006/0216508 A1 | 9/2006 | Denisyuk et al. |
| 2006/0221021 A1 | 10/2006 | Hajjar et al. |
| 2006/0238103 A1 | 10/2006 | Choi et al. |
| 2006/0238671 A1 | 10/2006 | Kim et al. |
| 2006/0240258 A1 | 10/2006 | Sato et al. |
| 2006/0240590 A1* | 10/2006 | Mountziaris et al. ........... 438/99 |
| 2006/0244367 A1 | 11/2006 | Im et al. |
| 2006/0245710 A1 | 11/2006 | Borrelli et al. |
| 2006/0274226 A1 | 12/2006 | Im et al. |
| 2006/0279296 A1 | 12/2006 | Lee et al. |
| 2006/0286382 A1 | 12/2006 | Anzures et al. |
| 2007/0001581 A1 | 1/2007 | Stasiak et al. |
| 2007/0012928 A1 | 1/2007 | Peng et al. |
| 2007/0012941 A1 | 1/2007 | Cheon |
| 2007/0014318 A1 | 1/2007 | Hajjar et al. |
| 2007/0018102 A1 | 1/2007 | Braune et al. |
| 2007/0034833 A1 | 2/2007 | Parce et al. |
| 2007/0036510 A1 | 2/2007 | Ingman et al. |
| 2007/0036962 A1 | 2/2007 | Sasaki et al. |
| 2007/0045777 A1 | 3/2007 | Gillies et al. |
| 2007/0087197 A1 | 4/2007 | Jang et al. |
| 2007/0090755 A1 | 4/2007 | Eida et al. |
| 2007/0096078 A1 | 5/2007 | Lee et al. |
| 2007/0096634 A1 | 5/2007 | Krummacher |
| 2007/0098160 A1 | 5/2007 | Lablans |
| 2007/0112097 A1 | 5/2007 | Olson et al. |
| 2007/0112101 A1 | 5/2007 | Choi et al. |
| 2007/0112118 A1 | 5/2007 | Park et al. |
| 2007/0115995 A1 | 5/2007 | Kim et al. |
| 2007/0121129 A1 | 5/2007 | Eida et al. |
| 2007/0131905 A1 | 6/2007 | Sato et al. |
| 2007/0152177 A1* | 7/2007 | Nichols ..................... 250/504 R |
| 2007/0164661 A1 | 7/2007 | Kuma |
| 2007/0200492 A1 | 8/2007 | Cok et al. |
| 2007/0201056 A1 | 8/2007 | Cok et al. |
| 2007/0223219 A1 | 9/2007 | Medendorp et al. |
| 2007/0241661 A1 | 10/2007 | Yin |
| 2007/0263408 A1 | 11/2007 | Chua et al. |
| 2008/0001124 A1 | 1/2008 | Hachiya et al. |
| 2008/0001167 A1 | 1/2008 | Coe-Sullivan et al. |
| 2008/0001528 A1 | 1/2008 | Eida |
| 2008/0012031 A1 | 1/2008 | Jang et al. |
| 2008/0029710 A1 | 2/2008 | Sekiya et al. |
| 2008/0048936 A1 | 2/2008 | Powell et al. |
| 2008/0057342 A1 | 3/2008 | Sekiya |
| 2008/0074050 A1 | 3/2008 | Chen et al. |
| 2008/0144333 A1 | 6/2008 | Gourlay |
| 2008/0169753 A1 | 7/2008 | Skipor et al. |
| 2008/0172197 A1 | 7/2008 | Skipor et al. |
| 2008/0173886 A1 | 7/2008 | Cheon et al. |
| 2008/0237540 A1 | 10/2008 | Dubrow |
| 2008/0254210 A1 | 10/2008 | Lai et al. |
| 2008/0276817 A1 | 11/2008 | Hinch et al. |
| 2008/0277626 A1 | 11/2008 | Yang et al. |
| 2009/0001385 A1 | 1/2009 | Skipor et al. |
| 2009/0017268 A1 | 1/2009 | Skipor et al. |
| 2009/0021148 A1 | 1/2009 | Hachiya et al. |
| 2009/0034292 A1 | 2/2009 | Pokrovskiy et al. |
| 2009/0050907 A1 | 2/2009 | Yuan et al. |
| 2009/0057662 A1 | 3/2009 | Brazis et al. |
| 2009/0059554 A1 | 3/2009 | Skipor et al. |
| 2009/0091943 A1 | 4/2009 | Hotary |
| 2009/0152567 A1 | 6/2009 | Comerford et al. |
| 2009/0162011 A1 | 6/2009 | Coe-Sullivan et al. |
| 2009/0174022 A1 | 7/2009 | Coe-Sullivan et al. |
| 2009/0196160 A1 | 8/2009 | Crombach et al. |
| 2009/0208753 A1 | 8/2009 | Coe-Sullivan et al. |
| 2009/0215208 A1 | 8/2009 | Coe-Sullivan et al. |
| 2009/0215209 A1 | 8/2009 | Anc et al. |
| 2009/0251759 A1 | 10/2009 | Domash et al. |
| 2009/0283743 A1 | 11/2009 | Coe-Sullivan et al. |
| 2009/0321755 A1 | 12/2009 | Jang et al. |
| 2010/0051898 A1 | 3/2010 | Kim et al. |
| 2010/0068468 A1 | 3/2010 | Coe-Sullivan et al. |
| 2010/0103648 A1 | 4/2010 | Kim et al. |
| 2010/0110728 A1 | 5/2010 | Dubrow et al. |
| 2010/0113813 A1 | 5/2010 | Pickett et al. |
| 2010/0123155 A1 | 5/2010 | Pickett et al. |

(56) References Cited

U.S. PATENT DOCUMENTS

| | | | |
|---|---|---|---|
| 2010/0144231 A1 | 6/2010 | Landry et al. |
| 2010/0155749 A1 | 6/2010 | Chen et al. |
| 2010/0167011 A1 | 7/2010 | Dubrow |
| 2010/0193806 A1 | 8/2010 | Byun |
| 2010/0208493 A1 | 8/2010 | Choi et al. |
| 2010/0243053 A1 | 9/2010 | Coe-Sullivan et al. |
| 2010/0246009 A1 | 9/2010 | Polley et al. |

FOREIGN PATENT DOCUMENTS

| | | |
|---|---|---|
| EP | 1793330 | 6/2007 |
| GB | 2147542 A | 5/1985 |
| JP | 02-244104 | 9/1990 |
| JP | 04-229807 | 8/1992 |
| JP | 4238304 | 8/1992 |
| JP | 04-281433 | 10/1992 |
| JP | 05-152609 | 6/1993 |
| JP | 05-303017 | 11/1993 |
| JP | 06-163984 | 6/1994 |
| JP | 06-238161 | 8/1994 |
| JP | 06-301071 | 10/1994 |
| JP | 07-002912 | 1/1995 |
| JP | 08-007614 | 1/1996 |
| JP | 09-050057 | 2/1997 |
| JP | 09-080434 | 3/1997 |
| JP | 2002-216962 | 8/2002 |
| JP | 2006-073869 | 3/2006 |
| WO | WO-98/30998 | 7/1998 |
| WO | WO 01/66997 A2 | 9/2001 |
| WO | WO 01/66997 A3 | 9/2001 |
| WO | WO-03/070816 | 8/2003 |
| WO | WO-03/079414 | 9/2003 |
| WO | WO-2005/067524 | 7/2005 |
| WO | WO-2006/055873 | 5/2006 |
| WO | WO-2006/104689 | 10/2006 |
| WO | WO-2007/002234 | 1/2007 |
| WO | WO-2007/009010 | 1/2007 |
| WO | WO-2007/046649 | 4/2007 |
| WO | WO-2007-103310 A3 | 11/2007 |
| WO | WO-2007/136816 | 11/2007 |
| WO | WO-2008/088663 | 7/2008 |
| WO | WO-2009/002512 | 12/2008 |
| WO | WO-2009/011922 | 1/2009 |
| WO | WO-2009/014590 | 1/2009 |
| WO | WO-2009/014707 | 1/2009 |
| WO | WO-2009/035657 | 3/2009 |
| WO | WO-2009/137053 | 11/2009 |
| WO | WO-2009/145813 | 12/2009 |
| WO | WO-2009/151515 | 12/2009 |
| WO | WO-2010/014205 | 2/2010 |

OTHER PUBLICATIONS

Dabbousi, et al., J. Phys. Chem 101 : 9463 (1997).
D.E. Fogg, et al, "Fabrication of Quantum Dot-Polymer Composites: Semiconductor Nanoclusters in Dual-Function Polymer Matrices with Electron-Transporting and Cluster-Passivating Properties" Macromolecules 1997, 30, 417-426.
N.C. Greenham, et al, "Charge seperation and transport in conjugated-polymer/semiconductor-nanocrystal composites studied by photoluminescence quenching and photoconductivity" Physical Review B vol. 54, No. 24, Dec. 15, 1996, pp. 17628-17637.
Margaret A. Hines, et al, "Synthesis and Characterization of strongly Luminescing ZnS-Capped CdSe Nanocrystals" J.Phys. Chem. 1996, 100, 468-471.
C.R. Kagan, et al, "Long-range resonance transfer of electronic excitations in close-packed CdSe Quantum-dot solids" Physical Review B vol. 54, No. 12 Sep. 15, 1996-II.
S.A. Empedocles, et al, "Photoluminescence Spectrosopy of Single CdSe nanocrystallite Quantum Dots" vol. 77, No. 18, Oct. 28, 1996.
F.V. Mikulec, et al, "Synthesis and Characterization of Highly Luminescent (CdSe)ZnS Quantum Dots" Met. Res. Soc. Symp. Proc. vol. 452 1997 Materials Research Society.
A.R. Kortan, et al, "Nucleation and Growth of CdSe on ZnS Quantum Crystallite Seeds, and Vice Versa in Inverse Micelle Media" Journal of the American Chemical Society, 1990, 112, 1327-1332.
Horst Weller, "Quantized Semiconductor Particles: A Novel State of Matter for Materials Science" Adv. Mater. 1993. 5. No. 2, pp. 88-95.
Jinwook Lee, et al, "Full Color Emission from II-VI Semiconductor Quantum Dot-Polymer Composites" Adv. Mater. 2000, 12, No. 15, Aug. 2, 1102-1105.
C.B. Murray, et al, "Synthesis and Characterization of Nearly Monodisperse CdE (E=S, Se, Te) Semiconductor Nanocrystallites" 1993 American Chemical Society, 115, 8706-8715.
A.V. Firth, et al., "Optical Properties of CdSe nanocrystals in a polymer matrix", Applied Physics Letters, vol. 75, No. 20, 3120 et seq. (1999).
S. Yanagida, et al., "Preparation of Quantized-CdS Doped Poly(Methyl Methacrylate) Films, Optical and Morphotogical Properties", Chem. Lett., pp. 1773-1776, 1990.
Pelling and Sauter 2004 colour at nanoscale.
International Search Report on Patentability, issued Jan. 5, 2010, for PCT/US2008/07902.
International Report on Patentability,issed Sep. 9, 2008, for PCT/US2007/005589.
U.S. Appl. No. 11/622,215 Office Action dated Oct. 14, 2010.
U.S. Appl. No. 11/622,215 Office Action dated Jan. 4, 2010.
Coe-Sullivan, et al., "Large-Area Ordered Quantum-Dot Monolayers via Phase Separation During Spin-Casting", Adv. Finc. Mater. 2005, 15, 1117-1124.
Coe, et al., "Electroluminescence from single monolayers of nanocrystals in molecular devices", Nature, 2002, vol. 420 800-803.
Moeller, et al., "Quantum-Dot Light emitting Devices for Displays," Information Display Conference, 2006.
EP Application No. 07752303.3-1218/2041478-PCT/US2007005589—Extended European Search Report dated Mar. 18, 2011.
European Patent Office Communication, dated Jul. 12, 2012, in corresponding European Patent Application No. 07 752 303.3.
Murray, Christopher, Ph.D. Thesis entitled "Synthesis and Characterization of II-VI Quantum Dots and Their Assembly into 3-D Quantum Dot Superlattices", Massachusetts Institute of Technology, Sep. 1995.
U.S. Appl. No. 11/622,215 Office Action mailed Feb. 15, 2012.
U.S. Appl. No. 11/622,215 Office Action mailed Sep. 12, 2012.

* cited by examiner

Scattering "Mirrors"
on back plane direct light
Toward predetermined pattern

Waveguide or Parabolic Effect
Collects and guides Ambient
Light for Absorption and Re-Emission
By Semiconductor Nanocrystals

ARTICLE INCLUDING SEMICONDUCTOR NANOCRYSTALS

CLAIM OF PRIORITY

This application is a continuation of commonly owned PCT Application No. PCT/US2007/005589 filed 6 Mar. 2007, which was published in the English language as PCT Publication No. WO 2007/103310 on 13 Sep. 2007. The PCT Application claims priority from commonly owned U.S. Application No. 60/779,740 filed 7 Mar. 2006. The disclosures of each of these applications are hereby incorporated herein by reference in their entireties.

TECHNICAL FIELD

The present invention relates to an article. More particularly, the present invention relates to an article including semiconductor nanocrystals.

SUMMARY OF THE INVENTION

In accordance with one aspect of the invention there is provided an article comprising semiconductor nanocrystals disposed in a predetermined pattern, wherein the semiconductor nanocrystals are capable of generating light of one or more predetermined wavelengths in response to ambient light.

In accordance with another aspect of the invention there is provided an article comprising semiconductor nanocrystals arranged to display the predetermined pattern, wherein the semiconductor nanocrystals are tuned to emit photons of one or more predetermined wavelengths in response to absorption of ambient light.

In accordance with a further aspect of the invention there is provided an article comprising semiconductor nanocrystals arranged to display the predetermined pattern, wherein the semiconductor nanocrystals comprise a core/shell structure and are tuned to emit photons of one or more predetermined wavelengths in response to absorption of ambient light.

In accordance with a still further aspect of the invention, there is provided an article comprising a viewable predetermined pattern of semiconductor nanocrystals, wherein the semiconductor nanocrystals are capable of generating light of one or more different predetermined wavelengths in response to ambient lighting.

In accordance with yet another aspect of the invention, there is provided an article comprising semiconductor nanocrystals disposed in a predetermined pattern, wherein the semiconductor nanocrystals are capable of generating light of one or more predetermined wavelengths in response to ambient lighting without requiring additional stimulation.

In accordance with still further aspects of the invention, various applications of articles in accordance with the invention are provided.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

BRIEF DESCRIPTION OF THE DRAWINGS

In the drawings.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

In accordance with one aspect of the invention, an article includes semiconductor nanocrystals that are disposed in a predetermined pattern.

Figure 1:
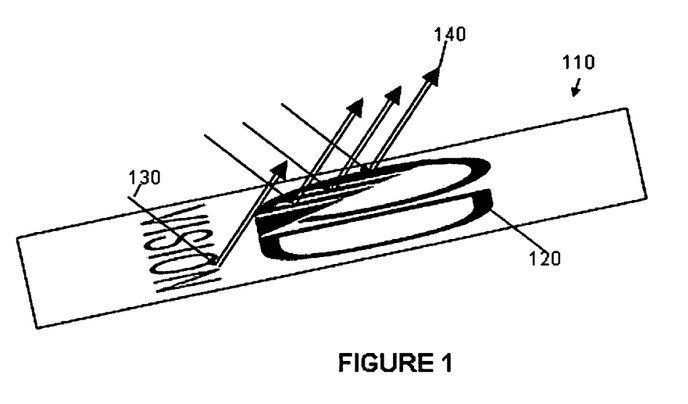
FIG. 1 is a schematic drawing depicting an example of an embodiment of an article of the invention.

FIG. 1 provides a drawing of an example of one embodiment of an article 110 of the present invention. The article includes a predetermined pattern 120. In this example, the pattern is disposed on a surface of the article.

The predetermined pattern 120 comprises semiconductor nanocrsytals that are capable of generating light 140 of one or more predetermined wavelengths in response to ambient light 130. Examples of ambient light include natural light and/or ambient artificial lighting.

At least a portion of the ambient light that is absorbed by the semiconductor nanocrystals is re-emitted as one or more photons of light. The emitted photons can be of the same or different wavelengths and can increase the brightness of the pattern.

The predetermined pattern can be of any configuration or content. For example, the predetermined pattern can display any type of image (e.g., logo, design, picture, other graphics, text (e.g., letters, words, numbers, combinations of letter, words and/or numbers), and/or combinations thereof (e.g., a combination of a logo, design, picture, other graphics, and/or text). Alternatively, the predetermined pattern can be a layer that fully or partially covers a predetermined area. When the semiconductor nanocrystals are disposed as a layer, a second predetermined pattern, comprising emissive and/or non-emissive particles, can be further disposed over and/or under the nanocrystal layer. When the second pattern comprises non-emissive particles, for example, the brightness of the semiconductor nanocrystal background layer can enhance the visibility of the non-emissive pattern disposed thereover.

Embodiments of the present invention can be used to enhance the display of a predetermined pattern without requiring stimulation other than ambient light. These embodiments are particularly useful for improving the display of the predetermined pattern on an unlimited variety of products and other tangible objects and articles, including, but not limited to, windows, walls, buildings, signage, architectural structures, furniture, articles of clothing, clothing accessories, footwear, hats, headgear, jewelry, eye-glasses, sun-glasses, other eye-wear, luggage, handbags, brief cases, totes, automobiles, other motor, air, or water vehicles of any type, sports equipment, televisions, display screens, stereos, other sound equipment and peripherals, laptop computers, other computer hardware and peripherals, Compact Discs, DVDs, telephones, cell phones, handheld electronics (e.g., PDAs, MP3 players, IPOD® devices (IPOD is a registered trademark of Apple Computer, Inc.), books, bottles, consumer products, other products, product packaging, etc. The article can further optionally be a faceplate, decal, emblem, medal, medallion, disc, tag, film, tape, etc. that can be fixedly or removably attached to a second article for any purpose (including, but not limited to, branding, identification, warning, instructional or other informational and/or decorative purposes). Attachable articles can optionally further include a backing comprising adhesive, Velcro, or other conventional means for attaching the article to a second article. When an adhesive is included on the back, a removable sheet of backing material or release paper can be further included. Such backing material or release paper overlies the adhesive and is loosely adhered thereto. In this embodiment, to mount the article, the backing material or release paper is removed and the adhesive backing is pressed against the surface on which the articles is to be attached or mounted.

While embodiments of the present invention can be used to enhance the display of a predetermined pattern without requiring stimulation other than ambient light, this does not mean that additional stimulation or excitation cannot or should not be used with such embodiments. Embodiments of the present invention, if optionally used with additional stimulation or excitation means, will show further enhanced display of the predetermined pattern, as the brightness of the predetermined pattern is further enhanced when semiconductor nanocrystals of the predetermined pattern are additionally excited or stimulated. Examples of such additional excitation or stimulation means include, without limitation, backlighting, electrical connection of the pattern to a current source, a light source to focus additional light energy on the pattern, etc.

Embodiments of the invention including additional excitation or stimulation, such as electrical connection to a current source, can optionally further include additional materials and/or layers (patterned or unpatterned), preferably transparent, disposed under and/or over the predetermined pattern. Examples of such materials and/or layers include electrode materials, charge transport materials, charge injection materials, and/or charge blocking materials. These are well known to persons having ordinary skill the relevant field. While any or all of the above additional materials and/or layers can optionally be included when additional excitation or stimulation is not contemplated, preferably these materials and/or layers are not included when additional excitation or stimulation is not contemplated.

The predetermined pattern can be disposed on a viewable surface of the article. In one embodiment in which the article is, or in which the article includes a portion that is, light-transmissive, the pattern can be disposed on the inner or outer side of a light-transmissive viewable surface of the article (the outer side being the side of the viewable surface closer to the viewpoint, the inner side being the side of the viewable surface more remote from the viewpoint). In another embodiment of an article that is light-transmissive or includes a light-transmissive portion, the semiconductor nanocrystals can alternatively be encapsulated or embedded in such light-transmissive area of the article or in a light-transmissive layer or coating disposed on either side of the viewable light-transmissive portion of the article. In the foregoing examples of various embodiments, the light-transmissive portion of the article is preferably transmissive to at least ambient light and the photons emitted by the patterned semiconductor nanocrystals.

Because semiconductor nanocrystals have narrow emission linewidths, are photoluminescent efficient, and emission wavelength tunable with the size and/or composition of the nanocrystals, they are desirable lumophores for use in the present invention.

The size and composition of the semiconductor nanocrystals can be selected such that semiconductor nanocrystals emit photons at a predetermined wavelength of wavelength band in the far-visible, visible, infra-red or other desired portion of the spectrum. For example, the wavelength can be between 300 and 2,500 nm or greater, such as between 300 and 400 nm, between 400 and 700 nm, between 700 and 1100 nm, between 1100 and 2500 nm, or greater than 2500 nm.

For example, the pattern can include semiconductor nanocrystals that emit light at the same or different wavelengths. By including an arrangement the semiconductor nanocrystals that emit light at different wavelengths, a multicolor pattern can be formed. The semiconductor crystals can enhance the display of a pattern that is single color, multi-color, and/or white.

In a monochromatic embodiment, the semiconductor nanocrystals are selected to emit at a predetermined wavelength or wavelength band for the desired color upon absorption of ambient light. In a multi-color or polychromatic embodiment, for example, the semiconductor nanocrystals are selected to emit two or more different predetermined wavelengths for the desired light output upon absorption of ambient light. The nanocrystals can further be arranged according to the wavelength or wavelength band of their emission in accordance with the predetermined pattern.

Semiconductor nanocrystals are nanometer-scale inorganic semiconductor particles. Semiconductor nanocrystals included in the article of the invention preferably have an average nanocrystal diameter less than about 150 Angstroms (Å), and most preferably in the range of 12-150 Å.

However, depending upon the composition and desired emission wavelength of the semiconductor nanocrystal, the average diameter may be outside of these various preferred size ranges.

Semiconductor nanocrystals include, for example, inorganic crystallites between about 1 nm and about 1000 nm in diameter, preferably between about 2 nm and about 50 um, more preferably about 5 nm to about 20 nm (such as about 6, 7, 8, 9, 10, 11, 12, 13, 14, 15, 16, 17, 18, 19, or 20 nm).

The semiconductor forming the nanocrystals comprises Group II-VI compounds, Group II-V compounds, Group III-VI compounds, Group III-V compounds, Group IV-VI compounds, Group I-III-VI compounds, Group II-IV-VI compounds, or Group II-IV-V compounds, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof, including ternary and quaternary mixtures.

Examples of the shape of the semiconductor nanocrystals include sphere, rod, disk, other shape or mixtures thereof.

Preferably, the semiconductor nanocrystals preferably include a "core" of one or more first semiconductor materials, which may be surrounded by an overcoating or "shell" of a second semiconductor material. A semiconductor nanocrystal core surrounded by a semiconductor shell is also referred to as a "core/shell" semiconductor nanocrystal.

For example, the semiconductor nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as semiconductor nanocrystal cores include, but are not limited to, CdS, CdSe, CdTe, ZnS, ZnSe, ZnTe, MgTe, GaAs, GaP, GaSb, GaN, HgS, HgSe, HgTe, InAs, InP, InSb, InN, AlAs, AlP, AlSb, AlS, PbS, PbSe, Ge, Si, alloys thereof, and/or mixtures thereof, including ternary and quaternary mixtures.

In a preferred embodiment, the surrounding "shell" material can have a bandgap greater than the bandgap of the core material and can be chosen so as to have an atomic spacing close to that of the "core" substrate. In another embodiment, the surrounding shell material can have a bandgap less than the bandgap of the core material. In a further embodiment, the shell and core materials can have the same crystal structure. Shell materials are discussed further below. For further examples of core/shell semiconductor structures, see U.S. application Ser. No. 10/638,546, entitled "Semiconductor Nanocrystal Heterostructures", filed 12 Aug. 2003, which is hereby incorporated herein by reference in its entirety.

The semiconductor nanocrystals included in the predetermined pattern are preferably members of a population of semiconductor nanocrystals having a narrow size distribution. More preferably, the semiconductor nanocrystals comprise a monodisperse or substantially monodisperse population of semiconductor nanocrystals.

The % absorption of the patterned semiconductor nanocrystals is, for example, from about 1% to about 99%. Preferably the % absorption of the patterned semiconductor nanocrystals is at least about 10% to about 99%. In one preferred example, the % absorption is from about 10% to about 90% absorption. In another preferred example, the % absorption is from about 10% to about 50%; in another example, the % absorption if from about 50% to about 90%.

Semiconductor nanocrystals show strong quantum confinement effects that can be harnessed in designing bottom-up chemical approaches to create complex heterostructures with electronic and optical properties that are tunable with the size and composition of the nanocrystals.

Preparation and manipulation of semiconductor nanocrystals are described, for example, in U.S. Pat. Nos. 6,322,901 and 6,576,291, and U.S. Patent Application No. 60/550,314, each of which is hereby incorporated herein by reference in its entirety. One method of manufacturing a semiconductor nanocrystal is a colloidal growth process. Colloidal growth occurs by injection an M donor and an X donor into a hot coordinating solvent. One example of a preferred method for preparing monodisperse semiconductor nanocrystals comprises pyrolysis of organometallic reagents, such as dimethyl cadmium, injected into a hot, coordinating solvent. This permits discrete nucleation and results in the controlled growth of macroscopic quantities of semiconductor nanocrystals. The injection produces a nucleus that can be grown in a controlled manner to form a semiconductor nanocrystal. The reaction mixture can be gently heated to grow and anneal the semiconductor nanocrystal. Both the average size and the size distribution of the semiconductor nanocrystals in a sample are dependent on the growth temperature. The growth temperature necessary to maintain steady growth increases with increasing average crystal size. The semiconductor nanocrystal is a member of a population of semiconductor nanocrystals. As a result of the discrete nucleation and controlled growth, the population of semiconductor nanocrystals obtained has a narrow, monodisperse distribution of diameters. The monodisperse distribution of diameters can also be referred to as a size. Preferably, a monodisperse population of particles includes a population of particles wherein at least 60% of the particles in the population fall within a specified particle size range. A population of monodisperse particles preferably deviate less than 15% rms (root-mean-square) in diameter and more preferably less than 10% rms and most preferably less than 5%.

The narrow size distribution of the semiconductor nanocrystals allows the possibility of light emission in narrow spectral widths. Monodisperse semiconductor nanocrystals have been described in detail in Murray et al. (J. Am. Chem. Soc., 115:8706 (1993)); in the thesis of Christopher Murray, "Synthesis and Characterization of II-VI Quantum Dots and Their Assembly into 3-D Quantum Dot Superlattices", Massachusetts Institute of Technology, September, 1995; and in U.S. patent application Ser. No. 08/969,302 entitled "Highly Luminescent Color-selective Materials" which are hereby incorporated herein by reference in their entireties.

The process of controlled growth and annealing of the semiconductor nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened. The M donor can be an inorganic compound, an organometallic compound, or elemental metal. M is cadmium, zinc, magnesium, mercury, aluminum, gallium, indium or thallium. The X donor is a compound capable of reacting with the M donor to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, bis(trimethylsilyl) selenide ($(TMS)_2Se$), trialkyl phosphine selenides such as (tri-noctylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride ($(TMS)_2Te$), bis(trimethylsilyl)sulfide ($(TMS)_2S$), a trialkyl phosphine sulfide such as (tri-noctylphosphine) sulfide (TOPS), an ammonium salt such as an ammonium halide (e.g., $NH_4Cl$), tris(trimethylsilyl) phosphide ($(TMS)_3P$), tris(trimethylsilyl) arsenide ($(TMS)_3As$), or tris(trimethylsilyl) antimonide ($(TMS)_3Sb$). In certain embodiments, the M donor and the X donor can be moieties within the same molecule.

A coordinating solvent can help control the growth of the semiconductor nanocrystal. The coordinating solvent is a compound having a donor lone pair that, for example, has a lone electron pair available to coordinate to a surface of the growing semiconductor nanocrystal. Solvent coordination can stabilize the growing semiconductor nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the semiconductor nanocrystal production. Examples of suitable coordinating solvents include pyridine, tri-n-octyl phosphine (TOP), tri-n-octyl phosphine oxide (TOPO) and trishydroxylpropylphosphine (tHPP). Technical grade TOPO can be used.

Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals. For example, for CdSe and CdTe, by stopping growth at a particular semiconductor nanocrystal average diameter and choosing the proper composition of the semiconducting material, the emission spectra of the semiconductor nanocrystals can be tuned continuously over the wavelength range of 300 nm to 5 microns, or from 400 nm to 800 nm.

As discussed above, preferably the semiconductor nanocrystals have a core/shell structure in which the core includes an overcoating on a surface of the core. The overcoating (also referred to as the shell) can be a semiconductor material having a composition that is the same as or different from the composition of the core. The overcoat of a semiconductor material on a surface of the core semiconductor nanocrystal can include a Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, alloys thereof, and/or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating may comprise one or more layers. The overcoating comprises at least one semiconductor material which is the same as or different from the composition of the core. Preferably, the overcoating has a thickness of from about one to about ten monolayers.

The particle size distribution of the semiconductor nanocrystals can be further refined by size selective precipitation with a poor solvent for the semiconductor nanocrystals, such as methanol/butanol as described in U.S. Pat. No. 6,322,901. For example, semiconductor nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected semiconductor nanocrystal population preferably has no more than a 15% rms deviation from mean diameter, more preferably 10% rms deviation or less, and most preferably 5% rms deviation or less.

In certain embodiments, the semiconductor nanocrystals optionally have ligands attached thereto.

In one embodiment, the ligands are derived from the coordinating solvent used during the growth process. The surface can be modified by repeated exposure to an excess of a competing coordinating group to form an overlayer. For example, a dispersion of the capped semiconductor nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the semiconductor nanocrystal, including, for example, phosphines, thiols, amines and phosphates. The semiconductor nanocrystal can be exposed to short chain polymers which exhibit an affinity for the surface and which terminate in a moiety having an affinity for a suspension or dispersion medium. Such affinity improves the stability of the suspension and discourages flocculation of the semiconductor nanocrystal.

More specifically, the coordinating ligand can have the formula:

wherein k is 2, 3 or 5, and n is 1, 2, 3, 4 or 5 such that k-n is not less than zero; X is O, S, S=O, SO2, Se, Se=O, N, N=O, P, P=O, As, or As=O; each of Y and L, independently, is aryl, heteroaryl, or a straight or branched C2-12 hydrocarbon chain optionally containing at least one double bond, at least one triple bond, or at least one double bond and one triple bond.

The hydrocarbon chain can be optionally substituted with one or more C1-4 alkyl, C2-4 alkenyl, C2-4 alkynyl, C1-4 alkoxy, hydroxyl, halo, amino, nitro, cyano, C3-5 cycloalkyl, 3-5 membered heterocycloalkyl, aryl, heteroaryl, C1-4 alkylcarbonyloxy, C1-4 alkyloxycarbonyl, C1-4 alkylcarbonyl, or formyl. The hydrocarbon chain can also be optionally interrupted by —O—, —S—, —N(Ra)—, —N(Ra)—C(O)—O—, —O—C(O)—N(Ra)—, —N(Ra)—C(O)—N(Rb)—, —O—C(O)—O—, —P(Ra)—, or —P(O)(Ra)—. Each of Ra and Rb, independently, is hydrogen, alkyl, alkenyl, alkynyl, alkoxy, hydroxylalkyl, hydroxyl, or haloalkyl. An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyiridyl, pyrrolyl, phenanthryl.

A suitable coordinating ligand can be purchased commercially or prepared by ordinary synthetic organic techniques, for example, as described in J. March, Advanced Organic Chemistry, which is incorporated herein by reference in its entirety.

See also U.S. patent application Ser. No. 10/641,292 entitled "Stabilized Semiconductor Nanocrystals", filed 15 Aug. 2003, which is hereby incorporated herein by reference in its entirety.

When an electron and hole localize on a semiconductor nanocrystal, emission can occur at an emission wavelength. The emission has a frequency that corresponds to the band gap of the quantum confined semiconductor material. The band gap is a function of the size of the semiconductor nanocrystal. Semiconductor nanocrystals having small diameters can have properties intermediate between molecular and bulk forms of matter. For example, semiconductor nanocrystals based on semiconductor materials having small diameters can exhibit quantum confinement of both the electron and hole in all three dimensions, which leads to an increase in the effective band gap of the material with decreasing crystallite size. Consequently, both the optical absorption and emission of semiconductor nanocrystals shift to the blue, or to higher energies, as the size of the crystallites decreases.

For an example of blue light-emitting semiconductor nanocrystal materials, see U.S. patent application Ser. No. 11/071,244, filed 4 Mar. 2005, which is hereby incorporated by reference herein in its entirety.

The emission from the semiconductor nanocrystal can be a narrow Gaussian emission band that can be tuned through the complete wavelength range of the ultraviolet, visible, or infra-red regions of the spectrum by varying the size of the semiconductor nanocrystal, the composition of the semiconductor nanocrystal, or both. For example, CdSe can be tuned in the visible region and InAs can be tuned in the infra-red region. The narrow size distribution of a population of semiconductor nanocrystals can result in emission of light in a narrow spectral range. The population can be monodisperse preferably exhibits less than a 15% rms (root-mean-square) deviation in diameter of the semiconductor nanocrystals, more preferably less than 10%, most preferably less than 5%. Spectral emissions in a narrow range of no greater than about 75 nm, preferably 60 nm, more preferably 40 nm, and most preferably 30 nm full width at half max (FWHM) for semiconductor nanocrystals that emit in the visible can be observed. IR-emitting semiconductor nanocrystals can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of semiconductor nanocrystal diameters decreases.

Semiconductor nanocrystals can have high emission quantum efficiencies such as greater than 10%, 20%, 30%, 40%, 50%, 60%, 70%, or 80%.

The narrow FWHM of semiconductor nanocrystals can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of semiconductor nanocrystals will emit light spanning a narrow range of wavelengths. A pattern including more than one size of semiconductor nanocrystal can emit light in more than one narrow range of wavelengths. The color of emitted light perceived by a viewer can be controlled by selecting appropriate combinations of semiconductor nanocrystal sizes and materials. The degeneracy of the band edge energy levels of semiconductor nanocrystals facilitates capture and radiative recombination of all possible excitons.

Transmission electron microscopy (TEM) can provide information about the size, shape, and distribution of the semiconductor nanocrystal population. Powder X-ray diffraction (XRD) patterns can provide the most complete information regarding the type and quality of the crystal structure of the semiconductor nanocrystals. Estimates of size are also possible since particle diameter is inversely related, via the X-ray coherence length, to the peak width. For example, the diameter of the semiconductor nanocrystal can be measured directly by transmission electron microscopy or estimated from X-ray diffraction data using, for example, the Scherrer equation. It also can be estimated from the UV/Vis absorption spectrum.

The predetermined pattern of semiconductor nanocrystals is preferably created in a controlled (oxygen-free and moisture-free) environment, preventing the quenching of luminescent efficiency during the fabrication process.

Semiconductor nanocrystals can be dispersed in a liquid medium and are therefore compatible with thin-film deposition techniques such as spin-casting, drop-casting, and dip coating.

Due to the packing of the semiconductor nanocrystal solids resulting from these deposition techniques, not all of the surfaces of the nanocrystals may be available to absorb and emit light.

Preferably, semiconductor nanocrystals are deposited on the surface using contact printing. This technique can be use for depositing a various thicknesses of semiconductor nanocrystals, from a monolayer thickness to a thickness selected to achieve the desired % absorption of the patterned semiconductor nanocrystals. Examples of desired % absorptions can include, without limitation, from about 1% to about 99%, from about 10% to about 90%, from about 10% to about 50%, from about 50% to about 90%. Preferably, the semiconductor nanocrystals absorb at least a portion of impinging light and reemit at least a portion of the absorbed light energy as one or more photons of a predetermined wavelength(s). Most preferably, the semiconductor nanocrystals do not absorb any, or absorb only negligible amounts of, the re-emitted photons. This approach allows a substantially dry (i.e., substantially liquid or solvent free) application of a patterned semiconductor nanocrystal film to a surface, thus freeing the surface of solubility and surface chemistry requirements.

The semiconductor nanocrystals can alternatively be deposited by solution based processing techniques, silk-screening, and other liquid film techniques available for forming patterns on a surface.

Alternatively, the semiconductor nanocrystals can be dispersed in a light-transmissive material (e.g., a polymer, a resin, a silica glass, or a silica gel, etc., which is preferably at least partially light-transmissive, and more preferably transparent, to the light emitted by the quantum dots and in which quantum dots can be dispersed) that is deposited as a full or partial layer or in a patterned arrangement by any of the above-listed or other known techniques. Suitable materials include many inexpensive and commonly available materials, such as polystyrene, epoxy, polyimides, and silica glass. After application to the surface, such material desirably contains a dispersion of semiconductor nanocrystals where the nanocrystals have been size selected so as to produce light of a given color. Other configurations of semiconductor nanocrystals disposed in a material, such as, for example, a two-dimensional layer on a substrate with a polymer overcoating are also contemplated. Dispersions of semiconductor nanocrystals in, e.g., polystryrene or epoxy, can be prepared as set forth, for example, in U.S. Pat. No. 6,501,091 or by other suitable techniques.

The area of the article that includes the predetermined pattern can be opaque or light-transmissive (e.g., translucent or transparent). The area can optionally be flat, contoured, or otherwise shaped, and can be rigid or flexible. The area of the article that displays the predetermined pattern can comprise any solid material, e.g., plastic, metal, glass, wood, ceramic, or other material.

In embodiments of the invention in which the area of the article including the pattern is light-transmissive, the article can optionally further include a region underlying the pattern that is capable of directing at least a portion of impingent light toward the semiconductor nanocrystals. Such region can, for example, comprise a waveguide or can be contoured to produce a parabolic effect.

Figure 2:
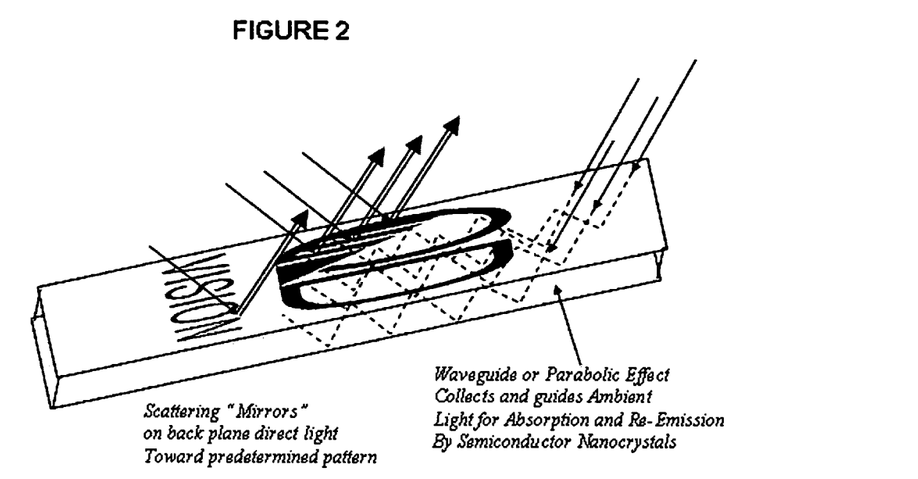
FIG. 2 is a schematic drawing depicting an example of an embodiment of an article of the invention.

FIG. 2 illustrates an example of an embodiment of the invention in which the material over which the patterned array of semiconductor nanocrystals is disposed acts as a waveguide to collect and guide at least a portion of the ambient light to the patterned array. Enhancing the collected/absorbed light will serve to enhance the contrast of the image under ambient light of all conditions.

Alternatively, a reflective material can be applied beneath the pattern of semiconductor nanocrystals, with the reflective material in light communication with light impinging upon the surface with the nanocrystals.

In another embodiment of the invention, the article further includes a cover, coating or layer over at least the portion of the surface upon which the predetermined pattern of semiconductor nanocrystals are disposed to protect the nanocrystals from the environment (e.g., dust, moisture, and the like) and/or scratching or abrasion. In a further embodiment, the cover can further optionally include a lens, prismatic surface, etc. Anti-reflection, light polarizing, and/or other coatings can also optionally be included over the pattern.

All the patents and publications mentioned above and throughout are hereby incorporated in their entirety by reference herein.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An article comprising semiconductor nanocrystals disposed in a predetermined pattern, a region underlying the predetermined pattern, the underlying region including means to collect and guide at least a portion of impingement ambient light to at least a portion of the semiconductor nanocrystals, and a light-transmissive layer over the pattern, wherein the semiconductor nanocrystals are capable of generating light of one or more predetermined wavelengths in response to ambient light to enhance display of the predetermined pattern.

2. An article in accordance with claim 1 wherein the semiconductor nanocrystals have a % absorption of from about 1% to about 99%.

3. An article in accordance with claim 1 wherein the semiconductor nanocrystals have a % absorption of from about 10% to about 90%.

4. An article in accordance with claim 1 wherein the semiconductor nanocrystals have a % absorption of from about 10% to about 50%.

5. An article in accordance with claim 1 wherein the semiconductor nanocrystals have a % absorption of from about 50% to about 90%.

6. An article in accordance with claim 1 wherein the pattern comprises an image.

7. An article in accordance with claim 1 wherein the pattern comprises a design.

8. An article in accordance with claim 1 wherein the pattern comprises text.

9. An article in accordance with claim 1 wherein the pattern comprises a logo.

10. A second article including an article of claim 1 attached thereto.

11. An article in accordance with claim 1 wherein the semiconductor nanocrystals are disposed on at least a portion of a surface of the article in the predetermined pattern.

12. An article in accordance with claim 11 wherein the surface is opaque.

13. An article in accordance with claim 11 wherein the surface is translucent.

14. An article in accordance with claim 11 wherein the surface is light-transmissive.

15. An article in accordance with claim 11 wherein the surface is flexible.

16. An article in accordance with claim 11 wherein a back plane underlying the semiconductor nanocrystals and overlying at least the portion of the surface of the article on which the semiconductor nanocrystals are disposed includes means capable of reflecting at least a portion of impinging ambient light toward the underside of the pattern.

17. An article in accordance with claim 16 wherein the means comprise a waveguide.

18. An article in accordance with claim 16 wherein the means comprise a parabolic reflector.

19. An article in accordance with claim 1 further including stimulation or excitation means to further enhance brightness of the pattern.

20. An article in accordance with claim 1 wherein the semiconductor nanocrystals comprise a substantially monodisperse population of semiconductor nanocrystals.

21. An article useful to display an image without requiring stimulation other than ambient light, the article comprising a predetermined pattern of semiconductor nanocrystals capable of generating light of one or more predetermined wavelengths in response to ambient light to enhance display of the predetermined pattern, a region underlying the predetermined pattern, the underlying region including means to collect and guide at least a portion of impingement ambient light to at least a portion of the semiconductor nanocrystals, and a light-transmissive coating over the pattern.

22. An article in accordance with claim 21 wherein the semiconductor nanocrystals comprise a core/shell structure.

23. An article in accordance with claim 22 wherein the core comprises a material having the formula MX, where M is cadmium, zinc, magnesium, mercury, aluminum, gallium, indium, thallium, lead, or mixtures thereof, and X is oxygen, sulfur, selenium, tellurium, nitrogen, phosphorus, arsenic, antimony, or mixtures thereof.

24. An article in accordance with claim 23 wherein the shell comprises material having the formula MX, where M is cadmium, zinc, magnesium, mercury, aluminum, gallium, indium, thallium, lead, or mixtures thereof, and X is oxygen, sulfur, selenium, tellurium, nitrogen, phosphorus, arsenic, antimony, or mixtures thereof.

25. An article in accordance with claim 24 wherein the pattern comprises semiconductor nanocrystals that emit at different wavelengths.

26. An article in accordance with claim 25 wherein the variation in the size of the semiconductor nanocrystals that emit at the same wavelength have a FWHM less than 60 nm.

27. An article in accordance with claim 25 wherein the variation in the size of the semiconductor nanocrystals that emit at the same wavelength have a FWHM less than 50 nm.

28. An article in accordance with claim 25 wherein the variation in the size of the semiconductor nanocrystals that emit at the same wavelength have a FWHM less than 30 nm.

29. An article useful for displaying a predetermined pattern without requiring stimulation other than ambient light, the article comprising semiconductor nanocrystals arranged to display the predetermined pattern, a region underlying the predetermined pattern, the underlying region including means to collect and guide at least a portion of impingement ambient light to at least a portion of the semiconductor nanocrystals, and a light-transmissive layer or coating over the pattern, wherein the semiconductor nanocrystals comprise a core/shell structure, and wherein the semiconductor nanocrystals are capable of generating light of one or more predetermined wavelengths in response to ambient light to enhance display of the predetermined pattern.

30. An article in accordance with claim 29 wherein at least a portion of the ambient light absorbed by the semiconductor nanocrystals is re-emitted by the semiconductor nanocrystals as one or more photons of light, thereby increasing the brightness of the pattern visible upon viewing.

31. An article useful for displaying a predetermined pattern without requiring stimulation other than ambient light, the article comprising a patterned array of semiconductor nanocrystals having a core/shell structure that are tuned to emit photons of one or more predetermined wavelengths in response to absorption of ambient light to enhance the display of the predetermined pattern, a region underlying the predetermined pattern, the underlying region including means to collect and guide at least a portion of impingement ambient light to at least a portion of the semiconductor nanocrystals, and a light-transmissive layer or coating over the pattern.

32. A second article including an article in accordance with claim 31.

33. A second article in accordance with claim 32 wherein the article is fixedly or removably attached to a second article.

34. An article in accordance with claim 31 wherein the article comprises a faceplate, decal, emblem, medal, medallion, disc, tag, film, tape.

35. An article comprising semiconductor nanocrystals disposed in a predetermined pattern and a region underlying the predetermined pattern, the underlying region including means to collect and guide at least a portion of impingement ambient light to at least a portion of the semiconductor nanocrystals, wherein the semiconductor nanocrystals are capable of generating light of one or more predetermined wavelengths in response to ambient light, wherein the article further includes a cover, coating or layer over at least the predetermined pattern of semiconductor nanocrystals to protect the nanocrystals from the environment.

36. An article in accordance with claim 35 further including a reflective material beneath the pattern of semiconductor nanocrystals.

37. An article in accordance with claim 35 wherein the cover further includes a lens.

38. An article in accordance with claim 35 wherein the cover further includes a prismatic surface.

39. An article in accordance with claim 35 wherein the article further includes an anti-reflection coating over the pattern.

40. An article in accordance with claim 35 wherein the article further includes a light polarizing coating over the pattern.

41. An article in accordance with claim 35 wherein cover, coating or layer is light-transmissive.

* * * * *